H. C. HOWELL.
CULTIVATOR.
APPLICATION FILED APR. 16, 1913.
1,074,950.
Patented Oct. 7, 1913.
2 SHEETS—SHEET 2.
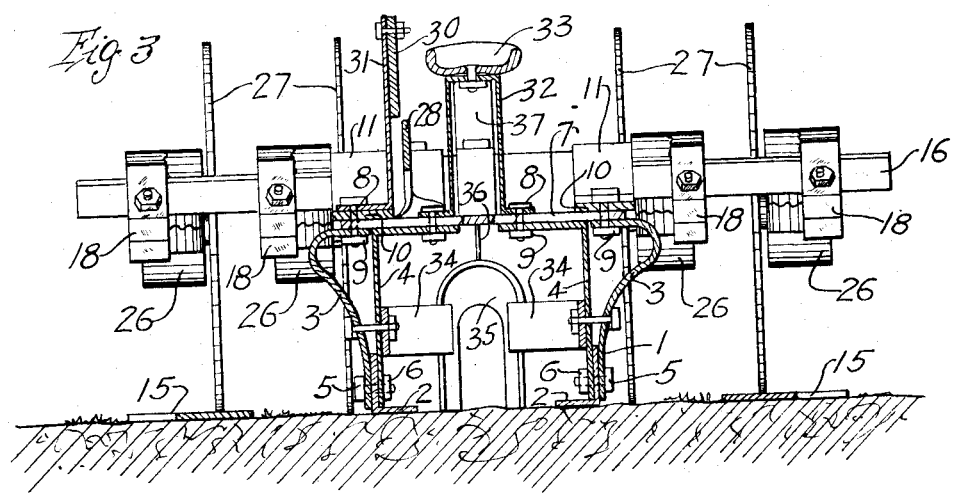
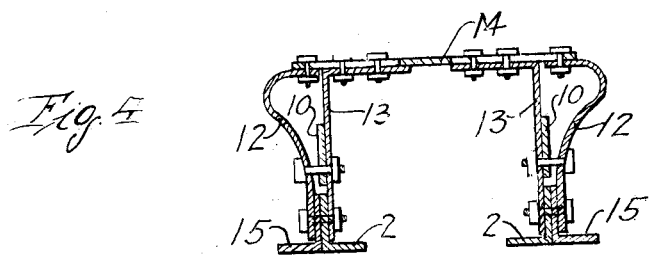
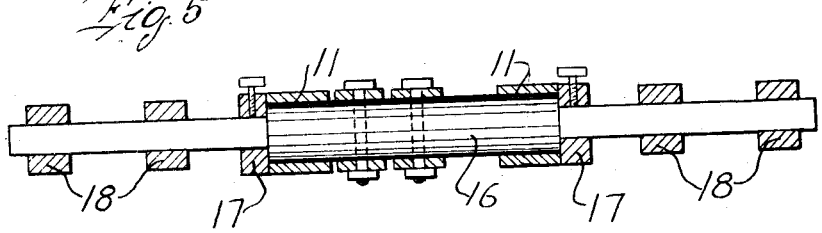
Inventor
H. C. HOWELL.
Witnesses
Robert M. Sutphend.
A. J. Hind.
By Watson E. Coleman
Attorney

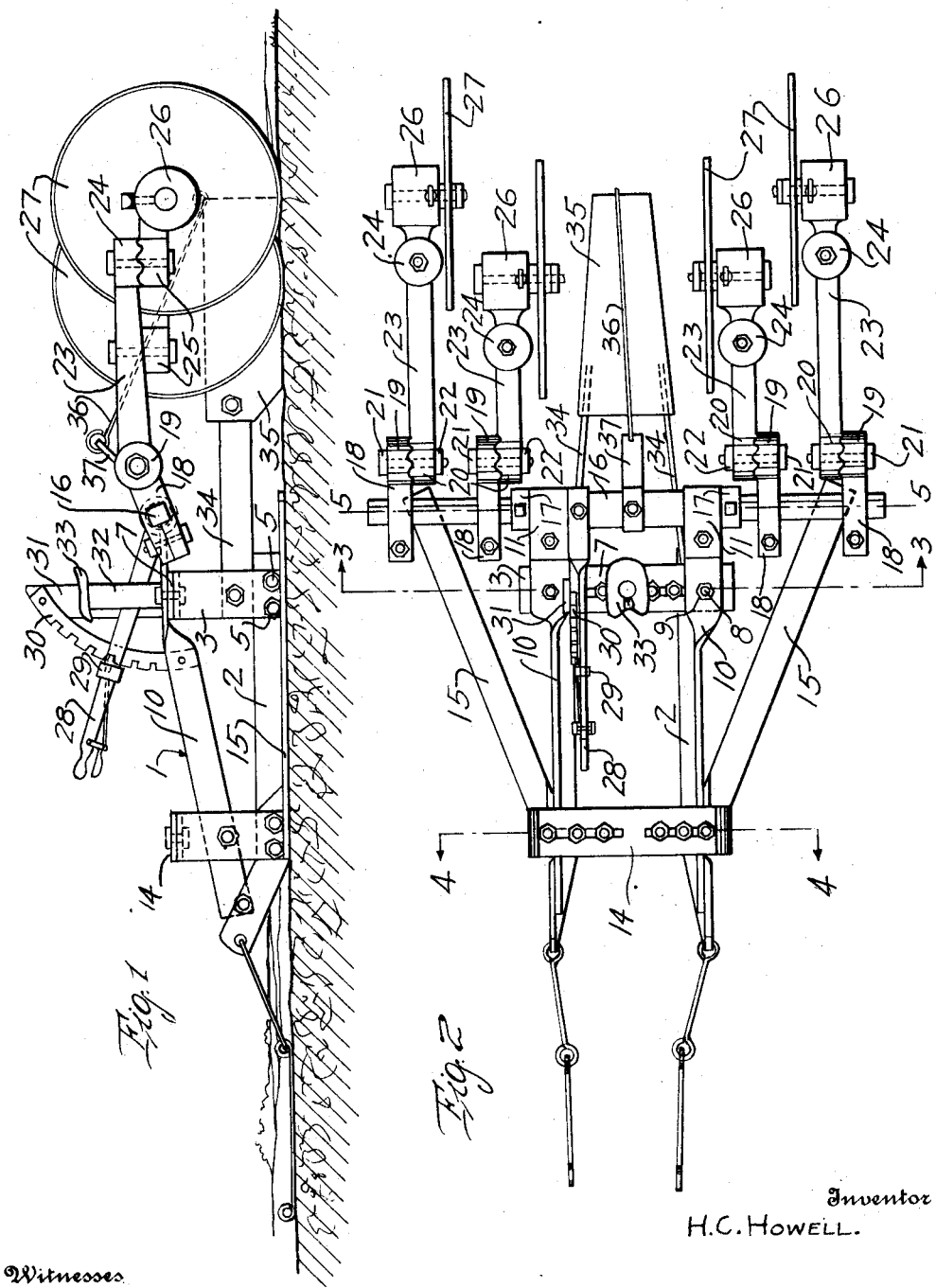

UNITED STATES PATENT OFFICE.

HENRY C. HOWELL, OF SPEERMOORE, OKLAHOMA.

CULTIVATOR.

1,074,950.  Specification of Letters Patent.  Patented Oct. 7, 1913.

Application filed April 16, 1913. Serial No. 761,543.

*To all whom it may concern:*

Be it known that I, HENRY C. HOWELL, a citizen of the United States, residing at Speermoore, in the county of Harper, and State of Oklahoma, have invented certain new and useful Improvements in Cultivators, of which the following is a specification, reference being had to the accompanying drawings.

This invention relates to new and useful improvements in cultivators and has for its object to provide a device of this character which is a vast improvement in construction and operation over other cultivators known to the art.

A further object of the invention resides in providing a cultivator in which the lower bars of the frame thereof are designed to form runners and a still further object resides in providing bracing straps, which form part of the frame and which continue rearwardly to form bearings for a shaft carrying the cultivating attachment.

Still another object of the invention resides in providing a device of improved structure which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of the device, Fig. 2 is a plan view thereof. Fig. 3 is a transverse section as seen on line 3—3, Fig. 2. Fig. 4 is a similar view as seen on line 4—4, Fig. 2; and Fig. 5 is a similar view as seen on line 5—5, Fig. 2.

In describing my invention, I shall refer to the drawings in which similar reference characters designate corresponding parts throughout the several views and in which 1 indicates the frame of my improved cultivator consisting of a pair of angular lower bars 2 which are designed to form runners for the device, the forward ends thereof being bent upwardly and having draft securing means attached thereto. An arch is formed in the rear portion of the frame by the provision of a pair of outer angular plates or arms 3, and an inner pair of similar angular plates or arms 4, the same having their lower ends secured to the angular metal bars 2 at the rear ends thereof by means of the bolts 5 and nuts 6. The upper portions of said pairs of angular plates are rigidly secured in position by means of a transverse plate or bar 7, the latter being adjustably held to said upper portions of the plates by means of the bolts 8 and nuts 9.

Removably secured to the upwardly bent ends of the runners 2 are the rearwardly extending and upwardly inclined straps or bars 10, which are twisted adjacent their rear ends and secured to the bar 7 of the rear arch by means of certain of the bolts and nuts 8 and 9 respectively. The straps 10 continue a short distance rearwardly of the arch, and then are bent forwardly upon themselves to form the bearings 11, the purpose of which will be hereinafter and more particularly set forth. A forward arch is also provided for the frame, the same being designed similar to the above referred to arch. This forward arch is composed of outer and inner pairs of angular plates or arms 12 and 13, respectively, the lower ends of which are removably secured by nuts and bolts to the runners 2, while the upper portions thereof are adjustably secured by means of nuts and bolts to the transverse securing plate or bar 14. In the case of both of these arches hereabove mentioned, the outer angular plates or bars are slightly bulged outwardly adjacent their upper portions and the aforesaid straps 10 extend in the space between the pairs of inner and outer angular plates, as clearly shown in Fig. 4 of the drawings.

Secured to the runners 2, by means of the same bolts and nuts which secure the lower portions of the angular plates or arms 12 and 13 to the frame, are the rearwardly extending knives 15 which project outwardly with respect to the frame 1. These knives 15 form weed cutters and are adapted to enter the soil slightly below the surface thereof, as the device is propelled.

Rotatably mounted in the bearings 11 at the rear ends of the straps 10, is a shaft 16, which is held in position thereon by means of the collars 17. This shaft projects some distance beyond the sides of the frame and these projecting portions thereof are square in cross section to rigidly receive in engagement therewith, a plurality of clamping members 18. The rear ends of these clamping members 18 which project slightly beyond the vertical plane of the bearings 11, are enlarged to form heads 19 and the inner face of each head is provided with a clutch face. An additional head 20 also having a clutch face thereon, is brought into contact with each of the heads 19 and adjustably held thereto, by means of a bolt 21 and nut 22. The heads 20 are formed on the forward ends of the arms 23 which may be of any desired length and it is obvious that through the medium of these clutch faces and adjusting bolts and nuts, said arms may be disposed to various angles and positions with respect to the surface of the ground. The rear end of each of said arms 23 is also provided with a head 24, the under face of which is provided with a clutch face and additional heads 25, each having a clutch face thereon, are brought into frictional contact with the heads 24 and adjustably held thereto by means of bolts and nuts, as used in connection with the first mentioned heads. These heads 25 are carried on projections from hubs 26 and rotatably carried on the inner end of each of said hubs 26 is a ground or cultivating disk 27. From the construction just described, it will be readily seen that these disks may be disposed to various angles and positions with respect to the ground and the main frame of the device, such adjustment being made possible by the adjustability of the aforesaid heads with respect to one another.

Rigidly secured to and projecting forwardly from the shaft 16, is a lever 28, which is provided thereon with a spring detent 29. A segmental rack or ratchet 30 is also provided, the lower end of which is secured to one of the straps 10 and the upper end of which is secured to a bracing arm 31, the latter being supported on the rear arch. It is obvious that from this construction, the shaft 16 may be partially rotated in the bearings by means of the lever to entirely raise the disks above the surface of the ground or lower the same into engagement with the ground, as desired. When adjusted, said lever may be retained in such position by means of this spring detent.

An inverted U-shaped brace or support 32 is also provided, the arms of which are secured to the transverse bracing bar 7 of the rear arch and a seat 33 is mounted on the base of this inverted U-shaped support. This seat is disposed immediately adjacent the operating lever just referred to, whereby the driver of the machine will be in position to operate the cultivating mechanism, at will.

Projecting rearwardly from the sides of the rear arch and converging rearwardly are the arms 34, the rear ends of which are secured to the forward end of an inverted channel-shaped member 35. This inverted channel-shaped member is braced from its rear end by means of an arm or link 36 to an arm 37 projecting rearwardly from the shaft 16. This channel-shaped member is disposed slightly in front of the disks and is adapted to act as a fender or guard for the same as the device is propelled. It is also obvious from the structure herein mentioned, and shown in the drawings, that as the shaft 16 is partially rotated in the bearings 11, said channel-shaped member will be raised or lowered, as the case may be.

From the foregoing description of the construction of my improved device, the operation thereof will be readily understood and it will be seen that I have provided a device which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

1. A cultivator of the class described comprising a frame consisting of a pair of runners, front and rear arches secured to said runners, side straps secured at their forward ends to the forward ends of the runners and inclined upwardly toward their rear ends to be secured to the rear arch, the free ends of said straps being designed to form bearings, a shaft mounted for partial rotation in said bearings, cultivating mechanisms mounted in connection with said shaft, and means for manually actuating said shaft.

2. In a cultivator, a frame comprising a pair of runners, front and rear arch members, each consisting of angular plates secured to the inner and outer faces of the runners, and bracing plates adjustably secured to the upper portions of said pairs of angular plates, side straps secured to the forward ends of said runners and inclined upwardly toward their rear ends to be secured to the rear arch member, the rear ends of said straps extending beyond the rear arch designed to form bearings, a shaft mounted for partial rotation in said bearings, cultivating mechanisms in connection with said shaft, and means for the manual actuation of said shaft.

In testimony whereof I hereunto affix my signature in the presence of two witnesses.

HENRY C. HOWELL.

Witnesses:
 ROBT. NEWBERRY,
 RAY E. NEWBERRY.